No. 857,587. PATENTED JUNE 25, 1907.
J. M. BOYLE.
APPARATUS FOR CONTINUOUSLY MAKING MONOLITHIC HOLLOW OBJECTS.
APPLICATION FILED FEB. 20, 1907.
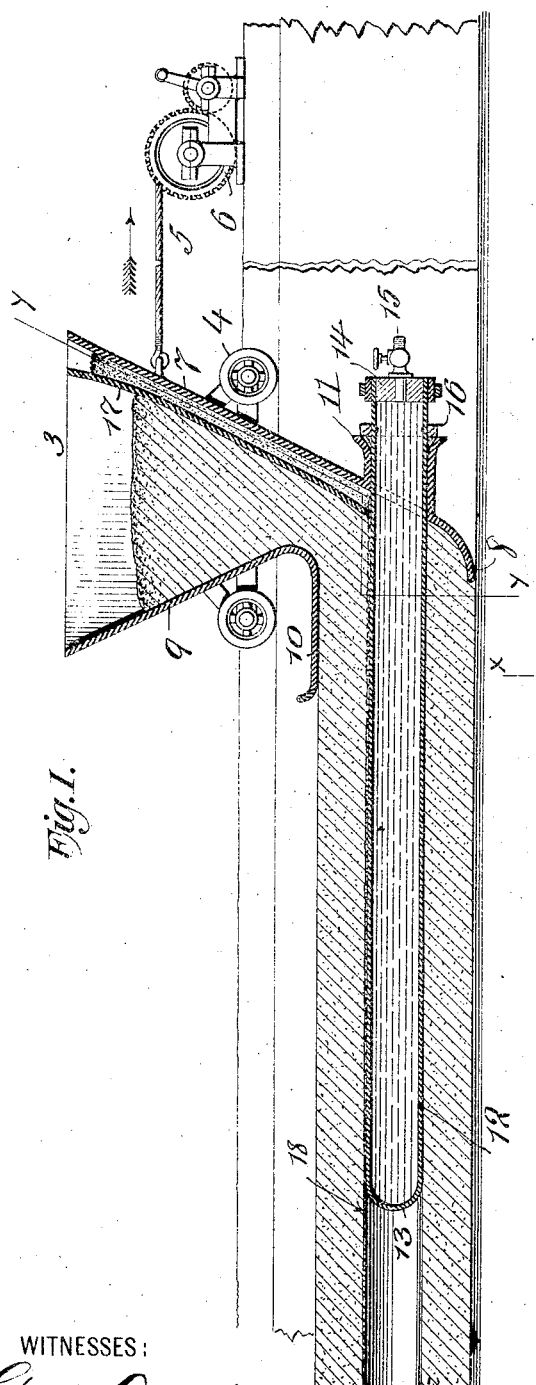
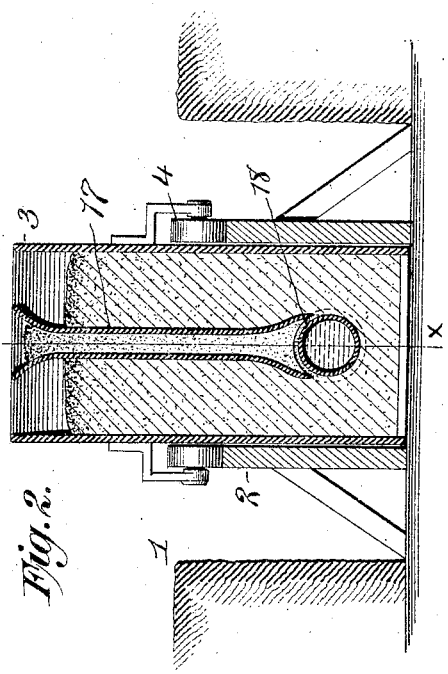
WITNESSES:
Gustave Dietrich
Edwin W. Dietrich
INVENTOR
James M. Boyle
BY Park Benjamin
his ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

APPARATUS FOR CONTINUOUSLY MAKING MONOLITHIC HOLLOW OBJECTS.

No. 857,587.     Specification of Letters Patent.     Patented June 25, 1907.

Application filed February 20, 1907. Serial No. 358,426.

*To all whom it may concern:*

Be it known that I, JAMES M. BOYLE, a citizen of the United States, residing at New York, in the county of New York and State of New York, have invented a certain new and useful Improvement in Apparatus for Continuously Making Monolithic Hollow Objects, of which the following is a specification.

The invention relates to the continuous production of elongated hollow objects, such as conduits for the conveyance of gas, liquids, electrical conductors, etc. from plastic material, capable of hardening by setting: and consists in an apparatus embodying movable device for continuously depositing plastic material to form the elongated object, preferably in a suitable open mold, and simultaneously forming a bore or cavity therein by a core carried by said device. Said core may be solid or hollow and of any suitable shape of cross section, but a flexible core is preferable since it permits the continuous making of the conduit around curves.

The invention further consists in the means for applying to the surface of the bore or cavity, as the same is produced by the core, a material capable of setting quicker than the main plastic mass, thus providing a relatively hard lining, which especially at the upper semi-circumference of the bore prevents any deformation of the bore during the setting of said mass.

In the accompanying drawings—Figure 1 is a vertical section of the apparatus on the line *x x* of Fig. 2. Fig. 2 is a transverse section on the line *y y* of Fig. 1.

Similar numbers of reference indicate like parts.

The invention, as hereinafter set forth, is embodied in an apparatus for continuously making monolithic cement conduits.

In the trench 1, I place side boards 2, forming a trough shaped mold. 3 is a receptacle for the plastic material of which the conduit is to be formed, mounted on trucks 4 for which the upper edges of the side boards 2 serve as rails. By means of the cord 5 carried to any suitable stationary winding apparatus 6, said receptacle may be moved in the direction of the arrow, Fig. 1.

The receptacle 3 has a hopper portion, the front wall 7 of which extends to the bottom of the mold. At its lower edge said wall is turned rearwardly as shown at 8: the rounded front edge serving to smooth the bottom of the mold as the receptacle is moved forward. The rear wall 9 of the hopper is also flanged rearwardly at 10. The height of the horizontal flange 10 above the bottom of the mold determines the vertical thickness of the molded conduit, and the lower face of flange 10 serves to smooth the upper surface of the plastic mass as the receptacle 4 is drawn ahead. The rear edge of flange 10 is preferably curved upwardly.

In the front wall 7 is a protruding tube 11, through which passes a tubular distensible core 12 of flexible material closed preferably integrally at one end 13, and at the other end by a plug 14, having a cock 15 communicating with the core interior. Any suitable means such as a ring or collar 16, fastened on the exterior of the core may serve to prevent the same from extending rearwardly beyond the wall 7, farther than some predetermined distance.

Within the hopper and preferably against the front wall thereof is formed a passage 17, enlarged at its upper end, and at its lower end also enlarged, and arched over the core 12.

The operation is as follows: The core 12 is first distended by internal fluid pressure, preferably water received from any suitable source through cock 15, opened for the purpose. The core 12 thus becomes practically solid and extends rearwardly and horizontally from the receptacle 2. Any convenient means may be used for holding it in place until the plastic material now shoveled into the hopper rises to the level of flange 10. The winding apparatus is now worked to draw the receptacle onward, plastic material meanwhile being continuously put into the hopper. The rate of speed of forward motion of the receptacle 2 should be such, and the rapidity of hardening of the plastic material also such, that although the core 12 being connected to the receptacle 2 is constantly carried onward by it, before that core completely leaves any section of the deposited mass in length equal to said core, said section will have sufficiently hardened and set, to retain its shape. In order, however, to assist the bore in retaining its shape, I may line said bore during the forming operation with a material relatively quicksetting as compared to the main body of plastic materials such for example as plaster of paris, when said main body is a mixture of cement and sand. To this end the plaster in powdered form is put into the passage 17 and is delivered therefrom directly upon the surface of core 12. By the forward movement of the apparatus as here constructed said plaster of paris becomes spread over the upper arched surface of the bore as shown at 18, and there obtaining moisture from the main plastic mass it quickly sets and so forms a hard lining.

I claim:—

1. A stationary mold, movable means for continuously depositing in said mold plastic material to form an elongated object, and means, carried by said first named means for forming a bore or cavity in the material deposited.

2. A stationary mold, movable means for continuously depositing in said mold plastic material to form an elongated object, and a core carried by said movable means.

3. A stationary mold, movable means for continuously depositing in said mold plastic material to form an elongated object, and a flexible core carried by said movable means.

4. A stationary mold, movable means for continuously depositing in said mold plastic material to form an elongated object, and a flexible distensible core carried by said movable means.

5. In an apparatus for continuously making elongated monolithic hollow objects, a stationary mold, a traveling hopper for depositing plastic material in said mold and a traveling core.

6. In an apparatus for continuously making monolithic elongated hollow objects, a stationary mold a traveling hopper for depositing plastic material in said mold and a core supported on said hopper and extending rearwardly therefrom.

7. In an apparatus for continuously making monolithic elongated hollow objects, a stationary mold a traveling hopper for depositing plastic material in said mold, having on one wall a flange for regulating the depth of said deposited material, and a core supported at one end in the other wall of said hopper and extending rearwardly therefrom.

8. In combination with means for continuously depositing plastic material to form an elongated object and means for forming a bore or cavity in said object, means for delivering a hardening material to the surface of said bore.

9. In combination with means for continuously depositing plastic material to form an elongated object and means for forming a bore or cavity in said object, means for conveying a relatively quick setting material to the surface of said bore.

10. In combination with means for continuously depositing plastic material to form an elongated object and means for forming a bore or cavity in said object, means for conveying a relatively quick setting material in comminuted form to the surface of said bore.

11. In an apparatus for continuously making elongated hollow objects from plastic material, a device for continuously depositing said plastic material, a core carried by said device, and means in said device for depositing a material relatively quick setting when moistened upon the surface of said core.

12. In an apparatus for continuously making elongated hollow objects from plastic material, a receptacle for continuously depositing said plastic material, a core carried by said receptacle and in said receptacle, a duct for conveying material, relatively quick setting when moistened, upon the surface of said core.

In testimony whereof I have affixed my signature in presence of two witnesses.

JAMES M. BOYLE.

Witnesses:
WM. H. SIEGMAN,
GERTRUDE T. PORTER.